Aug. 29, 1939.  O. M. URBAIN ET AL  2,171,203
PROCESS FOR THE PURIFICATION OF ORGANICALLY POLLUTED WATER
Filed Feb. 24, 1937
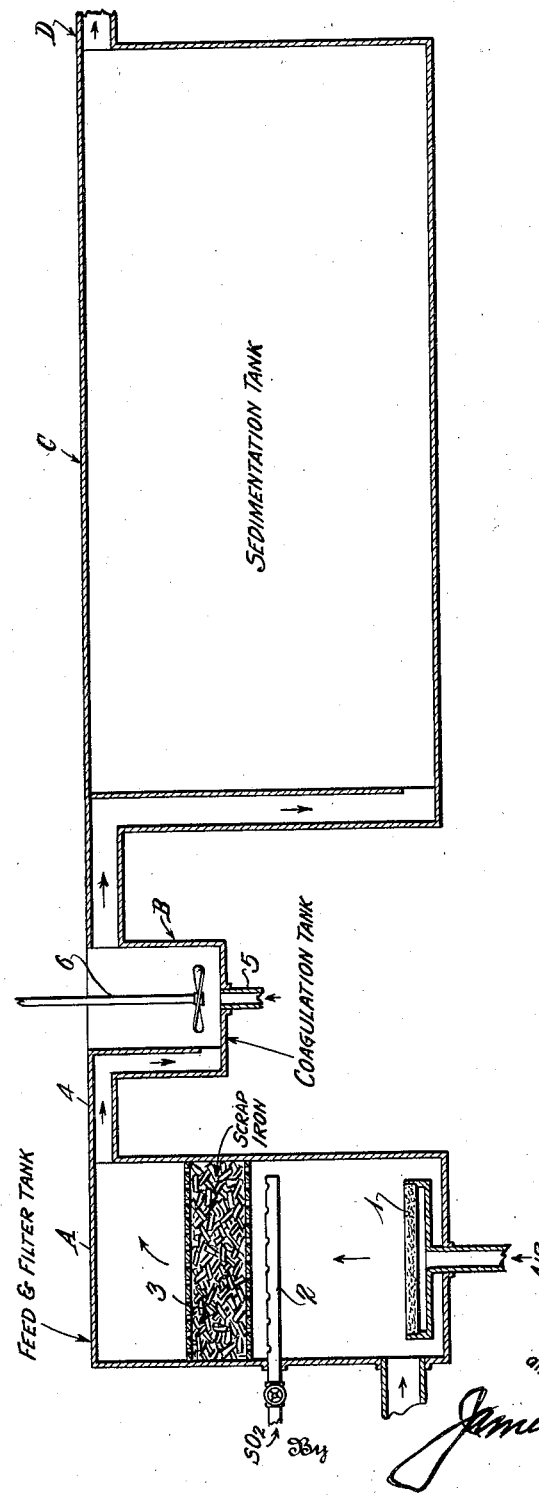
Inventors
Oliver M. Urbain
and William R. Stemen
Attorney Patented Aug. 29, 1939

2,171,203

UNITED STATES PATENT OFFICE 2,171,203

PROCESS FOR THE PURIFICATION OF ORGANICALLY POLLUTED WATER

Oliver M. Urbain and William R. Stemen, Columbus, Ohio, assignors to Charles H. Lewis, Harpster, Ohio Application February 24, 1937, Serial No. 127,491

5 Claims. (Cl. 210—2)

This invention relates to a process for the purification of organically polluted water. It is the purpose of the invention to provide a process that can be more economically operated than presently employed processes, a process that will give markedly improved results, and a process which requires a much shorter time period of treatment than purification processes currently employed.

In one of its more specific aspects, the invention contemplates the treatment of domestic sewage or the like by generating $Fe_2(SO_4)_3$ in situ with accompanying oxidation of the sewage.

Certain rather elemental reactions are availed of in carrying out the process, but these are employed in such relationship and in such combination that wholly new results are obtained.

To the end that mechanics of the process may be made clear, we will refer briefly to these recognized reactions and then point out the advantageous manner in which they are employed in the process.

The following reactions take place where $SO_2$ is introduced into the polluted water, such as sewage, in the presence of iron:

1. $SO_2$ plus organic compounds in true solution forms many loosely bound addition compounds which are easily oxidized.
2. $SO_2 + H_2O \rightleftarrows H_2SO_3$
3. $H_2SO_3 + O \rightarrow H_2SO_4$
4. $2H_2SO_3 + Fe \rightarrow Fe(HSO_3)_2 + H_2$
5. $Fe(HSO_3)_2 + 2O \rightarrow Fe(HSO_4)_2$
6. $H_2SO_3 + Fe \rightarrow FeSO_3 + H_2$
7. $FeSO_3 + O \rightarrow FeSO_4$
8. $Fe + H_2SO_4 \rightarrow SO_4 + H_2$
9. $2FeSO_4 + H_2SO_4 + O = Fe_2(SO_4)_3 + H_2O$ Beginning with the third reaction above, all of these reactions are oxidation type reactions and the oxidation of the sewage solids is carried along. Sulfurous acid formed in situ is a powerful auto-oxidation catalyst. It will be further noted that we form in situ both $FeSO_4$ and $Fe_2(SO_4)_3$ which act as coagulants. The valence of the Fe is elevated in the one instance to two and in the other instance to three. Thus, we have the induced oxidation effect in addition to powerful auto-oxidation catalytic effects of the $H_2SO_3$.

The $SO_2$ may be prepared by the conventional method which consists of burning sulfur in an ordinary sulfur burner. The S burns to $SO_2$, and the gas is collected and passed into the sewage and distributed directly under the bed of scrap iron. Bronze perforated piping is used for this purpose. When the $SO_2$ enters the sewage, it reacts with the water to form $H_2SO_3$ as shown by the following reaction:

$$SO_2 + H_2O = H_2SO_3$$

Referring to the drawing, the general flow of the water to be treated is as follows:

The water enters at the bottom of the oxidation tank A, overflows from the top of the oxidation tank, and enters the coagulation tank B and, after coagulation, the settling zone C. The effluents are discharged from the zone C at D.

As the polluted liquid, for example, sewage or the like, passes upwardly in the tank A, diffused air is passed into the solution from the filtros plate 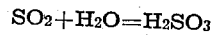 located in the bottom of the tank. $SO_2$ is passed into the solution through line 2 at a point just below the bed of scrap iron 3. All the reactions take place simultaneously within the zone occupied by the iron. Sufficient air is provided to always maintain a positive oxygen balance in the oxidation tank A. Sufficient $SO_2$ is passed into the solution to provide at least 200 P. P. M. of iron sulfates in the oxidation zone above the bed of iron. These balances are easily maintained and are necessary. The rate of flow of the sewage through the oxidation tank will depend upon the rate of formation of $Fe_2(SO_4)_3$. Generally speaking, a twenty-minute period of contact will be found sufficient to complete all of the reactions in this tank.

The solution next flows through line 4 and enters the coagulation zone or tank B. It is here treated with sufficient hydrated lime which is forced into the solution through line 5 at the bottom of the tank B to insure the maintenance of a pH of around pH 9.5. The material is agitated by means of a suitable agitator 6. A time period of from one to five minutes is sufficient for all actions occurring in the coagulation tank B.

From the coagulation zone B, the material under treatment next passes through conduit 7 into the sedimentation tank C. This tank C may be designed along conventional lines, with proper sludge facilities, baffles, etc. A detention period of two hours in this zone is ample.

We come now to the reasons for the use of the agents employed in this process and the manner in which they are employed.

The $SO_2$ is employed to effect the rapid oxidation of the iron with the formation of the necessary content of $Fe_2(SO_4)_3$. By thus accelerating the oxidation step, the oxidation period for the polluted liquid is reduced to less than thirty minutes as against approximately six hours for the currently employed activated sludge process. The reason for this accelerated oxidation is that as the iron is being oxidized three units in valence, it carries along the oxidation of the sewage constituents. The pronounced success of this process is, we believe, due to this discovery.

The $FeSO_4$ and $Fe_2(SO_4)_3$ formed function as coagulants in the coagulation tank after the addition of the calcium hydroxide to raise the pH of the solution to pH 9.5. The oxidation can be effected with atmospheric oxygen, which is a cheap oxidizing agent.

Among the advantages of this process may be listed the following:

(a) It provides a cheap and efficient method of preparing $Fe_2(SO_4)_3$ in situ to act as a coagulant.

(b) It permits taking advantage of the powerful oxidation set-up of $SO_2$ plus iron, plus oxygen, plus water.

(c) The use of air keeps the surface of the iron free of $Fe_2(SO_4)_3$, thus increasing the rate of formation thereof.

As a further feature of our invention, we have found that soluble manganese and soluble chromium salts will catalyze the oxidation of organic polluting constituents in the presence of iron sulfates. In our process, these salts may be advantageously introduced into the oxidation tank A in a concentration of about five pounds per million gallons.

Having thus described our invention, we claim:

1. A process for the purification of organically polluted liquid comprising passing the liquid through a bed of scrap iron, introducing sulfur dioxide and diffused air to pass simultaneously with the liquid through the bed of iron, forming iron sulfates in situ, and thereafter treating the resultant liquid with hydrated lime and passing the treated liquid to a settling zone.

2. A process for the purification of organically polluted liquid comprising subjecting the same to the simultaneous action of sulfur dioxide and air in the presence of iron to form iron sulfates in situ, and thereafter raising the pH of the solution to approximately pH 9.5 and delivering the same to a suitable sedimentation zone.

3. A process for the purification of organically polluted liquid comprising subjecting the same to the simultaneous action of sulfur dioxide and diffused air in the presence of metallic iron thereby forming iron sulfates in situ.

4. A process for the purification of organically polluted liquid comprising subjecting the same to the simultaneous action of sulfur dioxide and air in the presence of iron to form iron sulfates in situ, and facilitating oxidation of the polluting organic constituents by introducing a catalyst into the liquid simultaneously with the sulfur dioxide and the air.

5. A process for the purification of organically polluted liquid comprising subjecting the same to the simultaneous action of sulfur dioxide and air in the presence of iron to form iron sulfates in situ, and facilitating oxidation of the polluting organic constituents by introducing into the liquid simultaneously with the sulfur dioxide and the air, a catalyst, selected from the group including soluble manganese and chromium salts.

OLIVER M. URBAIN.
WILLIAM R. STEMEN.